United States Patent [19]

Perlman

[11] Patent Number: 5,065,030

[45] Date of Patent: Nov. 12, 1991

[54] RADON DETECTORS

[75] Inventor: Daniel Perlman, Arlington, Mass.

[73] Assignee: Brandeis University, Waltham, Mass.

[21] Appl. No.: 579,822

[22] Filed: Sep. 10, 1990

[51] Int. Cl.⁵ .................................................. G01T 5/00
[52] U.S. Cl. ........................ 250/472.1; 250/253/484.1
[58] Field of Search ............... 250/484.1 B, 484.1 A, 250/484.1 C, 472.1, 253

[56] References Cited

U.S. PATENT DOCUMENTS

| | | | |
|---|---|---|---|
| 4,073,865 | 2/1978 | Flanigen et al. | 423/339 |
| 4,800,272 | 1/1989 | Harley et al. | 250/253 |
| 4,812,648 | 3/1989 | Perlman | 250/255 |
| 4,855,603 | 8/1989 | Lindmayer | 250/484.1 B |

Primary Examiner—Carolyn E. Fields
Assistant Examiner—Drew A. Dunn
Attorney, Agent, or Firm—Lyon & Lyon

[57] ABSTRACT

A device and method for measuring radon gas concentration in an environment containing radon. The device includes a radon gas-adsorbing surface, which preferably has a capacity to adsorb radon at 90% relative humidity at 23° C. of at least 80% of its capacity to adsorb radon at a 0% relative humidity at 23° C.; and a radioactive decay-sensitive surface which registers incident particles or such rays from radioactive decay of radon and its daughters. The decay-sensitive surface is placed either adjacent to, or spaced from, the radon-adsorbing surface by less than 5 cm.

45 Claims, 1 Drawing Sheet

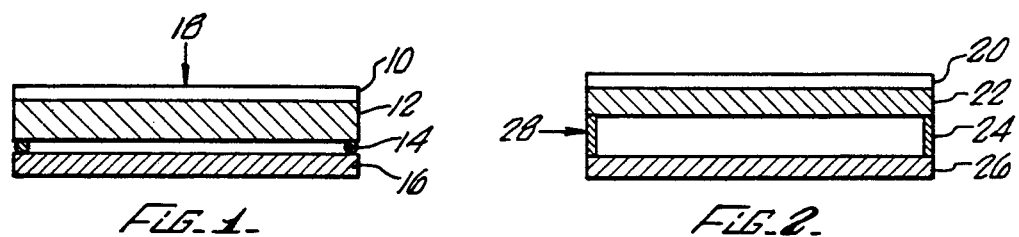
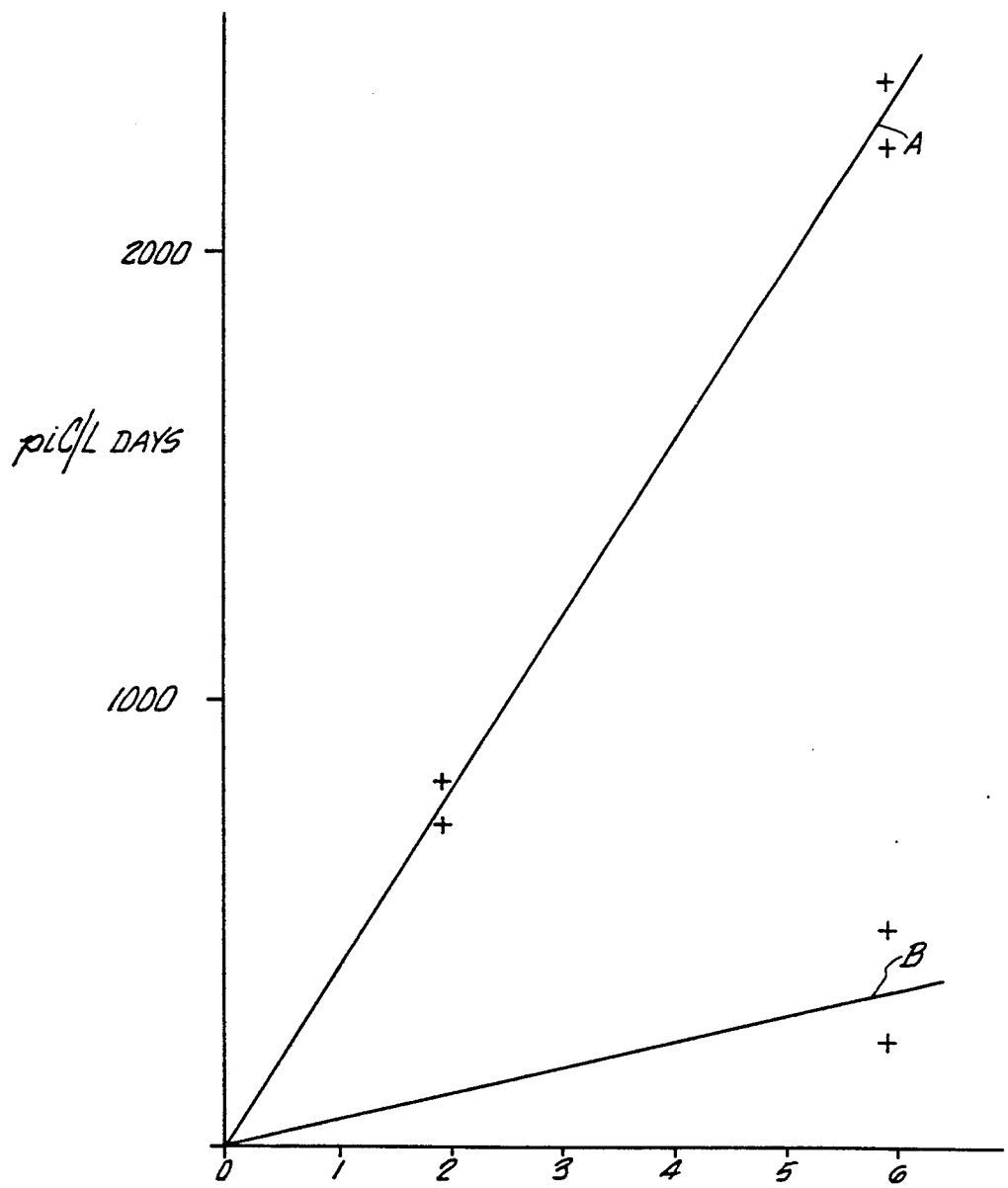

RADON DTECTORS

BACKGROUND OF THE INVENTION

This invention relates to devices for measuring the level of radon gas in air, soil or water.

There are several detectors used to measure airborne radon which rely upon detecting the α-particles, α-particles and/or γ-rays produced by the radioactive decay of radon, Rn-222, and its daughter or progeny isotopes Po-218, Pb-214, Bi-214, and Po-214. One aspect of the present invention is concerned with the design of detectors known as α-track detectors in which α-particles from Rn-222, Po-218 and Po-214 decays strike a sensitive detection surface such as polycarbonate plastic or nitrocellulose (see, Likes et al., 159 Nuclear Instruments and Methods 395, 1979). The number of submicroscopic damage tracks produced by these α-particles per unit area of detection surface per unit of exposure time, provides a measure of radon in the air.

In air, the maximum range of α-particles produced from radon decay is about 4-5 cm. Thus, for an α-track detector operating in air, α-particles which originate within the detector's 3-5 cm diameter air space may register on the detection surface.

The α-track device is useful largely because it can integrate radon decay events over long periods of time and thus provide valid average radiation exposure levels. The device, however, has been criticized because it is less sensitive than many other measurement techniques, requiring relatively long exposure intervals for accurate measurement of low levels of radon. For example, a CR39 polycarbonate plastic surface in a typical detector should receive about 50 picoCurie/liter-days of radon exposure for accurate radon measurement. Thus, a 25 day exposure period is required to accurately measure an airspace containing radon at a level of 2 pCi per liter of air.

The device is also criticized because it provides a measure of the concentration of daughter decay products generated from radon entering the detector, rather than radon itself. This criticism is not valid if the ratio of α-particles detected from radon daughters divided by the radon gas concentration is constant. Many environmental factors, however, during radon testing are difficult to control. Some of these factors are known to affect this ratio and thus compromise the accuracy of the test. For example, static electricity or dust, on or near a detector, can influence the local depositing of the electrically charged radon daughters. If the radon daughters inside one detector remain largely airborne and diffuse randomly while the daughters in another detector are deposited on the sidewalls, the frequency of their emitted α-particles striking the single detection surface in each device will be different.

To overcome the relatively low sensitivity of the α-track detector, several strategies have been utilized to increase the α-particle track density for a given radon level and exposure interval. One detector, manufactured by Tech/Ops Landauer, Inc., employs a nitrocellulose membrane which is exposed directly to ambient air to maximize the incident flux of α-particles from radon daughters. Although nitrocellulose is a very sensitive detection material for α-particles, it is more susceptible than polycarbonate plastic to the effect of moisture which can unpredictably alter the efficiency of the material in registering incident α-particles (Likes et al., supra).

A second design concept to increase α-track detector sensitivity has been recently reported (Miyake et al., 26 No. 4, Japanese Journal of Applied Physics 607, 1987; and Kotrappa et al., 43 Health Physics 399, 1982). This involves placing an electrically negative charged surface in proximity to the α-track detection surface to amplify the α-particle flux from positively charged radon daughters. The electrically charged surface has itself been utilized in the so-called "Electret" commercial detector device to quantitate radon concentration (Khan et al., 46, No. 1, Health Physics 141, 1984; Kotrappa et al., supra). Radon levels are measured by accumulating the daughter ions on an electrostatically negative charged TEFLON ® surface and precisely measuring the rate of voltage drop over the exposure interval. If, as commonly occurs, an Electret surface receives an uneven deposit of radon daughters and is positioned next to an α-track detection surface, the α-track surface will, in turn, receive an uneven pattern of irradiation by the α-particles produced from the deposited daughters. Such an uneven pattern makes analysis of the α-track density in the detection surface difficult and contributes uncertainty to the measured level of radon. Furthermore, the charged surface accumulates diffusible radon daughters, not radon gas, leading to the same uncertainties in radon measurement described above for the unmodified α-track detector.

SUMMARY OF THE INVENTION

The present invention features a method and apparatus for measuring radon gas concentration in air, soil or water. The method involves providing a detector (preferably containing a selective window for entry of radon and exclusion of radon daughters), with an essentially humidity-insensitive radon adsorbent surface (for concentrating radon gas), and a detection surface, e.g., an α-particle-sensitive detection surface placed in close proximity to that adsorbent surface. For the purposes of this invention, the term "surface" used in the context of a radon-adsorbent surface, a detection surface, or a radioactive decay event-sensitive surface, may be defined as a layer, coating, film, or sheet of material which usually has a flat geometry and which typically has a certain minimum effective thickness defining a certain volume of material. When the radon detector is exposed to airborne radon gas for a measured period of time, radon gas enters the detector and is retained within the adsorbent at a concentration per unit volume approximately 1,000-10,000 times greater than in the surrounding air. As each radon atom decays through a chain of radioactive daughters, α-particles, β-particles and γ-rays are emitted. The α-particles striking the sensitive detection surface (such as polycarbonate plastic) produce tracks which are later counted during analysis of the detector. For a given exposure time, the number of α-tracks per unit area of detection surface, i.e., the track density, serves as a measure of airborne radon gas concentration. Placing an essentially moisture-insensitive radon adsorbent surface (such as a hydrophobic molecular sieve) in close proximity to the detection surface increases the track density for radon gas approximately 10-fold (relative to the track density measured without an adsorbent surface). Examples of these adsorbents include the hydrophobic synthetic crystalline silica molecular sieves, silicalite (Flanigan et al., 271 Nature 512, 1978), and the even more hydrophobic silica polymorph, fluorosilicalite, whose synthesis is described by Flanigan et al., U.S. Pat. No. 4,073,865. This increase in α-track density results in improved detector sensitivity and accuracy for measuring relatively low levels of radon in relatively short periods of time. Measurement of α-particles emanating directly from the radon adsorbent (rather than from radon daughter populations in the gas phase and the walls of a conventional α-track detector) provides a direct method for measuring radon gas and for integrating its concentration over time.

Thus, in a first aspect, the invention features a device for measuring radon gas concentration in a radon-containing environment. The device includes a radon gas-adsorbing surface, preferably a substantially moisture-insensitive radon gas-adsorbing surface which has a capacity to adsorb radon gas at 90% relative humidity (abbreviated RH, such capacity to adsorb radon is measured by standard technique at 23° C.) of at least 80% of its capacity to adsorb radon at a 0% RH at 23° C. The device also includes a radioactive decay event-sensitive surface (e.g., a surface sensitive to α- or β-particles or γ-rays) which registers incident α- or β-particles, or γ-rays. The decay-sensitive surface is positioned in a generally parallel arrangement adjacent to, or separated by less than 5 cm from the radon-adsorbing surface. Such a decay-sensitive surface and monitoring means may be an α-particle-sensitive surface (upon which α-particles form optically detectable α-tracks), an electrically charged surface, e.g., an electret (and a voltaic means for measuring discharge on this surface), or a thermostimulable or photostimulable storage phosphor (and a photometric means for measuring subsequent photoemission from the phosphor).

In a related aspect, the invention features a device for measuring radon gas concentration in a radon-containing environment which includes a radon gas-adsorbing surface; a desiccant placed within or in close proximity to the adsorbing surface to remove moisture from the adsorbent to maintain the adsorbent essentially moisture-free during the period of testing under relative humidity conditions of up to 90% or even 100% RH; and a radioactive decay-sensitive surface, e.g., an α-particle-sensitive surface which registers incident α-particles. The decay-sensitive surface is again generally placed in a parallel arrangement to the radon-adsorbing surface and optionally spaced from the radon-adsorbing surface by less than 5 cm.

In preferred embodiments, the radon-adsorbing surface includes an essentially moisture-insensitive radon gas adsorbent having a capacity to adsorb radon, and may include a separate moisture-adsorbing material; the radon gas adsorbent has a capacity to adsorb radon at 90% relative humidity (RH) at a temperature of 23° C. of at least 90% of its capacity to adsorb radon at 0% (RH) at 23° C.; the radon adsorbent in the adsorbing surface retains less than 6% (w/w), weight per weight water at 90% RH at 23° C., most preferably less than 2% (w/w) water at 90% RH at 23° C.; the radon-adsorbing surface includes fluorosilicalite, silicalite, or activated charcoal; the surfaces are spaced by less than 1 cm, most preferably between 0 and 5 mm; and the device further includes a spacing ring between the radon gas-adsorbing surface and the decay-sensitive surface to hold the surfaces apart if necessary for radon gas entry, and in a generally parallel orientation.

In other preferred embodiments, the electrically charged radioactive decay-sensitive surface (e.g., of the electret) is contained within a chamber having a radon gas-permeable window, most preferably the chamber is impermeable to radon daughters and the charged surface is contained in an electrically-shielded chamber.

In another related aspect, the invention features a method for measuring radon gas concentration in a radon-containing environment. The method includes providing a radon gas-adsorbing surface, which is preferably substantially moisture-insensitive and has a capacity to adsorb radon gas at 90% relative humidity (RH) at 23° C. of at least 80% of its capacity to adsorb radon gas at 0% RH at 23° C.; providing a radioactive decay-sensitive surface, e.g., an α-particle-sensitive surface which registers incident α-particles; placing the radon gas-adsorbing surface and the decay-sensitive surface at a distance of less than 5 cm apart with the surfaces oriented parallel to each other; exposing the assembled surfaces to the radon-containing environment for a predetermined time; and detecting changes in the decay-sensitive surface; e.g., determining the number of α-tracks present on the α-particle-sensitive surface as a measure of the radon gas concentration.

In another related aspect, the invention features a similar method which includes providing a desiccant combined with, within, or in close proximity to the radon gas-adsorbing surface to remove moisture from the adsorbent and to maintain the adsorbent moisture-free during the period of testing under relative humidity conditions of up to 100% at 23° C.

The method of the present invention involves concentrating the radon gas from the surrounding radon-containing environment in an adsorbent, and converting the radon signal into a substantially increased flux of α-particles, β-particles and γ-rays which directly irradiate a juxtaposed detector surface (as radon and its daughters decay within the adsorbent to generate the α- and β-particles and γ-rays). Thus, the device is a true radon gas monitor, and variables which affect the movement of the α-emitting radon daughters inside α-track and Electret ion-type detectors do not affect the accuracy of the present detector.

Other features and advantages of the invention will be apparent from the following description of the preferred embodiments thereof, and from the claims.

DESCRIPTION OF THE PREFERRED EMBODIMENTS

The drawings will first briefly be described.

BRIEF DESCRIPTION OF THE DRAWINGS

FIG. 1 is a transverse sectional view of a wafer or card design α-track detector;

FIG. 2 is a transverse sectional view of a disc design α-track detector; and

FIG. 3 is a graphical representation of α-track density over time obtained with an α-track detector provided with a radon adsorbent surface (line A) or without a radon-adsorbing surface (line B).

Below is presented a description of various α-track detectors of the present invention. These examples are not limiting in this invention since any other radioactive decay-sensitive surface may be used. An example of other such surfaces are presented in the section entitled "Other Embodiments".

DETECTOR DESIGN

At least two different approaches can be used in designing an adsorbent-assisted α-track radon detector. First, existing conventional α-track detectors can be modified to accommodate a radon adsorbent film placed in close proximity to the α-track detection surface. For example, in the Terradex detector manufactured by Tech/Ops Landauer, Inc., the existing CR39 polycarbonate sheet (sensitive surface facing downward) positioned near the top of the detector's 12 cm$^3$ air space, can be supplemented with an underlying radon adsorbent surface. For example, a film (1.5 cm$^2$ area) containing 25 mg fluorosilicalite powder spread into the surface of a porous polyurethane sponge plug can be positioned between zero and five millimeters beneath the CR39 surface. The elasticity and porosity of the sponge serve to immobilize the sponge as well as the powder film within the detector.

A second approach to the detector design focuses on the essential operative features of the detector. Accordingly, a simple design for an adsorbent-assisted detector is to provide a very thin compact sandwich structure having a radon-permeable protective barrier layer or window over the radon adsorbent. The radon-permeable window may or may not limit radon diffusion into the detector and may provide mechanical support for the radon adsorbent. Also provided is a radon-permeable adsorbent layer approximately 0.1–1.0 mm thick, including a radon gas adsorbent which retains a concentration of radon proportional to that concentration in the ambient air, and which adsorbs radon essentially independent of the relative humidity in the same air.

Either or both of these layers are preferably resistant or impermeable to the entry of radon daughters so that only radon gas is detected as the radon diffuses throughout the adsorbent and decays in situ. Appropriate materials for use as a radon-selective window include fibrous cellulosic or synthetic microporous filters which present a large surface area for the incoming radon so that radon daughters are prevented from entering the detector. However, in an adsorbent-containing α-track detector, if it can be shown that greater than 90% of the α-tracks result from in situ decay of adsorbed radon, then the addition of a radon gas-selective entry window is unnecessary because the contribution from entering radon daughters is insignificant.

In addition, an α-particle-sensitive detection material which registers incident α-particles is provided, for example, polycarbonate or nitrocellulose. Optionally, a physical spacer, such as thin ring gasket or, alternatively an α-particle permeable spacer layer, may be placed between the radon adsorbent and detection layer. This serves to physically separate and prevent contact between the two layers if and when such contact is harmful to the detection surface or the α-particle detection process. Very thin (e.g., 5–10 micron) open mesh material, gas-permeable polyurethane foam and the like may also be used as a spacer layer.

Referring to FIG. 1, an example of such a detector is shown in cross-section. An upper radon entry window 10, which may be a microporous barrier to allow radon entry and exclude radon daughter isotopes, is provided adjacent a moisture-insensitive radon-permeable radon adsorbent 12. A spacing means 14, e.g., an O-ring, separates the adsorbent from an α-particle detector layer 16. Radon gas enters the device as shown by arrow 18. Such a device (which may be as thin as approximately ⅛ inch) can be constructed by standard procedure using materials discussed below.

As an alternative design, the detector may be disc-shaped and somewhat thicker, with the radon adsorbent (such as fluorosilicalite powder bonded with LU-DOX ® adhesive) coated onto or supported by a rigid gas-impermeable backing material, such as aluminum. Ambient radon enters the detector and the adsorbent within, via a space separating the adsorbent surface from the α-particle detection surface. The radon entry space may be around the circumference of the disc, and the spacer may be a radon gas-permeable (and radon daughter-impermeable) circumferential ring serving to separate and immobilize layers relative to one another. A separation distance of approximately 1–5 mm between these layers is appropriate.

Referring to FIG. 2, an example of such a detector is shown in cross-section. Here, a radon entry window 24, which may be a selective diffusion membrane, is provided on the circumferential edge of the detector. Perpendicular to this window is an essentially moisture-insensitive radon adsorbent layer 22 fixed to an impermeable support or backing 20. Parallel to and separated from the adsorbent layer 22 is an α-particle-sensitive detector 26. The path of radon gas entry is shown by arrow 28. This α-track detector can be constructed by standard techniques using materials discussed below.

The details of various portions of these detectors will now be generally described.

ADSORBENT SURFACES

Activated charcoal has ben used for about 80 years to adsorb and detect radon gas. It has been pointed out by many investigators that moisture uptake by charcoal reduces its adsorption capacity for radon. In Perlman, U.S. Pat. No. 4,812,648, it is shown that for each percentage (by weight) of water adsorbed, the retention of radon by activated coconut charcoal decreases approximately 2.8%. Therefore, a quantity of desiccant is juxtaposed to the granular charcoal in the passive diffusion radon detectors of Perlman to maintain charcoal dryness for approximately one week. However, longer exposure intervals are often desired with use of α-track radon detectors, so that a moisture-insensitive radon adsorbent is advantageous over one which requires a desiccant. Nevertheless, with the provision of an adequate quantity of desiccant (as described by Perlman, id.), an activated carbon surface can be juxtaposed to an α-particle detection surface to reproducibly amplify the α-particle flux and increase the sensitivity of the detector by a constant factor.

The activated carbon adsorption surface need be only a fraction of a millimeter thick because α-particle emission is blocked from carbon depths greater than about 0.1–0.2 millimeter. The radon adsorption surface should be placed parallel to and in reasonably close proximity to the α-particle detection surface to prevent α-particle attenuation by air. It should not be further than 2–3 cm from this surface, and certainly less than 5 cm. Diffusion entry of radon gas into the adsorption surface should remain unimpaired by the design and geometry of the adsorbent or by appropriate positioning of the α-particle detection surface. Thus, entry of radon gas into the adsorbent may be through its front surface (facing the α-particle detector surface), through its back surface (including a permeable support thereof), or through both surfaces. If unimpaired diffusion-entry of radon through the back surface is allowed, the adsorbent can be placed in essentially direct contact with the α-particle detector surface providing there is no adverse physical interaction between the juxtaposed materials (see below).

HYDROPHOBIC RADON ADSORBENTS

A survey of natural and synthetic molecular sieve materials including zeolites and both organic and inorganic synthetic molecular sieve materials, revealed a number of useful hydrophobic radon gas adsorbents. Of these materials it was discovered that a synthetic microporous crystalline silica molecular sieve known as silicalite (e.g., silicalite S-115 manufactured by Union Carbide) was useful in this invention. Unlike the hydrophilic aluminosilicate zeolites, silicalite contains no cations, hydroxyls, or other polar groups in the intracrystalline space and has no aluminum in its tetrahedral framework (Flanigen et al., supra). Consequently, silicalite is hydrophobic and selectively adsorbs organic molecules in the presence of water. The small micropore diameter (about 5.5–6 Å) excludes organic molecules larger than benzene. The fairly large intracrystalline surface area associated with silicalite's pore volume of 0.19 cm$^3$ per gram, coupled with its micropore diameter and chemistry have been found by applicant to combine to create high affinity binding for radon. Radon is organophilic and approximately 4 Å in diameter and would thus appear to fit snugly into the silicalite lattice.

A synthetic silica polymorph derivative of silicalite, fluorosilicalite, whose synthesis is described in U.S. Pat. No. 4,073,865, is even more hydrophobic than silicalite. For a given concentration of radon in air applicant has found that fluorosilicalite adsorbs a level of radon similar to that of silicalite but which is essentially independent of the relative humidity level in the air.

Even with condensing levels of airborne moisture (100% relative humidity, 23° C.), fluorosilicalite retains less than 1% (w/w) water, while silicalite retains approximately 6% (w/w) water. Such retention by fluorosilicalite reduces its radon retention less than 3% and for silicalite reduces its radon capacity approximately 18%. Under the same conditions, activated charcoal retains approximately 30% (w/w) water, reducing its ability to adsorb radon approximately 85%. At somewhat lower relative humidities (75–85%) silicalite was found to absorb only 1/10 as much moisture as activated charcoal (2.5% (w/w) compared to 25% (w/w) for charcoal) and its radon-retention was reduced only 7.5% compared to that of the dry material.

Thus, silicalite is suitable as a nearly moisture-proof radon adsorbent for radon testing performed under conditions of less than 75% relative humidity; and fluorosilicalite (or an equally hydrophobic molecular sieve which could efficiently adsorb radon) is suitable as an essentially moisture-proof radon adsorbent for radon testing in almost all environments including moist soil and other damp environments where relative humidity approaches 100%.

On the basis of radon adsorbed-per gram of material, silicalite and fluorosilicalite are only about ⅓ as efficient as desiccated charcoal. However, the constant and reproducible radon levels achieved with these synthetic materials in the presence of moisture, make them particularly useful in detectors of the present invention.

RADON-ADSORBENT FILMS

Six mev α-particles with a range of 0.05 mm in carbon (density of approximately 1.0) can travel similar distances through other adsorbents having comparable densities. Therefore a fluorosilicalite coating having a similar density need only be approximately 0.1 mm thick for maximum α-particle flux. Thicker uniform or non-uniform coatings of adsorbent will have no greater α-particle emission rates because beneath a certain depth of adsorbent, α-particles cannot escape. To maximize the escape flux of α-particles, the addition of film-forming adhesives or binders, and other adsorbent-diluting (or α-particle attenuating) materials to the radon adsorbent is kept to a minimum. For example, an approximately equal weight of 30% (w/w) colloidal silica solution in water (such as LUDOX LS from the DuPont Corp.) added to the radon adsorbent, is required for adhesive film formation. In the resultant gas-permeable film, the adsorbent represents about 100/130 or 77% of the total solids. It is expected that α-particle emission from this gas-permeable film will be reduced proportionately approximately, i.e. 23%. Support surfaces for such films should provide adequate adhesion with the film-forming adhesive to prevent cracking or chipping during the drying and the routine use of the film. In the case of LUDOX-type films, silica (glass) and oxidized metal surfaces (e.g. aluminum) provide useful substrates for durable films.

An α-track detector with an α-particle-sensitive target area of approximately 1.5 cm$^2$ is provided with a radon adsorbent surface of similar area placed in close proximity, i.e., within a few millimeters of the α-target. An adsorbent film of density 1.0 g/cm$^3$ and thickness of 0.1–0.2 mm requires only 15–30 mg of adsorbent material. Film thickness in excess of 0.2 mm provides no additional flux of escaping α-particles. Even an expensive adsorbent, such as fluorosilicalite, adds little to the cost of a detector since so little, e.g., 20 mg, is required. The adsorbent surface could be reused indefinitely, further reducing its cost.

USE OF α-TRACK DETECTOR

The essentially moisture-insensitive radon adsorbent fluorosilicalite was introduced into a standard α-track detector (Terradex detector, manufactured by Tech-/Ops Landauer) as a flat powder film of 0.2 mm thickness and placed in close proximity (3 mm distance) to the CR39 plastic α-particle detection surface. This alteration in detector design resulted in an 8.5-fold increase in radon sensitivity (see FIG. 3). That is, the modified Terradex detector exposed to a radon chamber environment for 5.5 days registered an apparent integrated exposure (on the basis of α-track density) of 2394 pCi/l-days. This is 8.5-fold greater than an unmodified detector which registered 283 pCi/l-days during the same exposure period in the same chamber. The latter reading corresponds to a radon concentration of 51.5 p Ci/l. An independently calibrated diffusion-equilibrium type charcoal adsorbent radon detector described in U.S. Pat. No. 4,812,648, which was simultaneously exposed, registered 52 p Ci/l, in excellent agreement with the regular Terradex α-track detector.

In engineering an adsorbent-containing α-track detector of the present invention, several calibrations should be carried out. First, for a detector containing a defined geometry and composition of radon adsorbent, the adsorbent film thickness is selected. The thickness is typically increased at least until a maximum rate of α-track production has been reached (maximum sensitivity). Second, a curve for α-track production versus time is generated using a series of identical detectors exposed for increasing periods of time (at essentially constant radon concentration). The empirical curve is typically a straight line but should be generated nevertheless to reveal any non-linearity in the detector's response and should encompass the entire range of possible exposure times, i.e, from approximately one day to one month or more. Third, a temperature compensation curve is generated using a series of identical detectors exposed to a constant radon concentration at different temperatures. Detectors exposed above and below room temperature and having slightly lower and higher sensitivities respectively to radon are compensated using the empirical, essentially linear graphical plot obtained for α-track density versus temperature.

The structure of the detectors of this invention comprises an adsorbent surface which quickly equilibrates with, and concentrates radon gas from, a volume of air being tested. As the radon decays an α-particle is emitted and the resulting radon daughters appear to remain immobilized in the adsorbing surface. With the decay of the radon daughters, two more α-particles are generated. A steady-state concentration of radon is rapidly established through rapid diffusion-equilibration of the typically thin adsorbent surfaces within detectors of the present invention (e.g., 15 min. equilibration) so that a steady rate of generation of α-particles is soon produced from the adsorbing surface. Such generation can then be maintained for between 1 day and 1 month for example to ensure adequate numbers of α-tracks on the α-particle detection surface.

Thus, a short time is required for radon gas to diffuse into the α-track detector of the present invention and equilibrate the radon absorbent so that a steady flux of α-particles can then be propagated toward the α-particle detection surface. As Cohen et al. point out in their article on diffusion barrier charcoal adsorption collectors for radon (50 Health Physics, 457, 1986) the equilibration time for the charcoal absorbent is extended by the presence of a diffusion barrier which controls the rate of entry of radon into the device. In fact, without a diffusion barrier, applicant has established that 1-2 mm diameter charcoal granules equilibrate with airborne radon in approximately 15 minutes. Thus, to a first approximation, if for radon, the adsorption coefficient and diffusion constant in various adsorbents including charcoal, silicalite and fluorosilicalite are similar, then it is expected that various adsorbent beds of only 0.1-0.2 mm thickness will equilibrate with airborne radon in only a few minutes. A diffusion barrier would extend this interval.

One of the objects of this invention is to maximize the sensitivity to α-particles produced from radon gas decay, thus the entry path for radon should exclude only (or pre-adsorb) the radon daughters in the ambient air. No benefit is derived from extending the time required to initially equilibrate and, following the test, to lose radon gas from the adsorbent bed. Without a significant diffusion barrier (and with little sustained radon above the adsorbent bed before or after the test period), the time for radon adsorption and radon daughter (α-particle emitter) ingrowth should approximate the time at the end of the test for radon desorption and radon daughter decay.

Detector overexposure artifact can theoretically occur if radon gas is kept from diffusing out of the adsorbent, e.g., by hermetically sealing the detector following cessation of the test. Thus, following a radon test, it is advisable to place the detector in a breathable shipping container, allowing normal radon gas desorption, or alternatively, to place the detector in a container or envelope together with an external radon adsorbent "sink" (such as a 1-2 g bag of activated charcoal).

A second type of detector overexposure may occur if the detector, whose α-particle sensitivity has been enhanced by the introduction of a radon adsorbent, is exposed to high levels of radon for long periods of time. That is, when the α-track density in the α-particle-sensitive surface exceeds certain limits, the device looses accuracy. To solve this problem, the radon adsorbent surface can be positioned parallel to and facing only a portion of the α-track surface, while the rest of the α-track surface remains as a lower sensitivity "control" surface. Thereafter when the α-track density is scanned, the readings from either the lower or the higher sensitivity portion will provide accurate measurements. Referring to FIGS. 1 and 2, radon adsorbent layers 12 and 22 may be reduced in width thereby spanning and facing only a portion of detector layers 16 and 26 respectively.

OTHER EMBODIMENTS

Other embodiments are within the following claims. For example, charged electret devices can be used in conjunction with a radon gas-adsorbing surface. The sensitivity of either a negatively or positively charged electret detector (e.g., a negatively-charged TEFLON ® disc in an electrically shielded chamber with a radon-permeable window), where the rate of electrical voltage discharge is a measure of the environmental radon concentration, can be greatly increased by introduction and juxtaposition of an essentially humidity-insensitive radon adsorbent, such as those described above. The emission of alpha(+) and beta(−) particles from the in situ decay of radon and its daughter decay products in such an adsorbent, and the deposit of either the alpha or beta particles on a charged electret surface will result in an accelerated rate of electret voltage discharge. Thus, an increased sensitivity for radon detection can be achieved by juxtaposition of a silicalite or fluorosilicalite radon-adsorbent surface and a charged electret surface. The fluorosilicalite radon adsorbent surface has been shown to generate approximately 10-fold the α-particle flux generated from the corresponding radon-containing air space. The same adsorbent surface may be used to amplify the beta particle flux from the decay of the radon daughters Pb-214 and Bi-214 and thereby accelerate the discharge of a positively charged electret radon detector.

In still another embodiment of the present invention, the above-described radon adsorbents are positioned in close proximity to a different type of radioactive decay event-sensitive surface, e.g., a material known as a storage phosphor. Detectors based on such materials include thermostimulable and photostimulable storage phosphors which are generally crystalline materials excited by α, β, and γ-radioactive decay events. The crystalline material stores energy from these excitation events at discrete lattice locations and subsequently liberates this energy in the form of light when, e.g., heat (for a thermostimulable storage phosphor) is applied to the material. Quantitation of the light output from such a detector provides a measure of integrated radiation exposure. For example, a radiation dosimeter comprising a stimulable storage phosphor has been recently described by Takayanagi, Japanese 63,305,280, 1988. Positioning one of the above-described radon gas adsorbents in close proximity to, e.g., a photostimulable or thermostimulable phosphor detector can substantially increase the detector's sensitivity to radon.

I claim:

1. A device for measuring radon gas concentration in a radon-containing environment, comprising a radon gas-adsorbing surface, and a radioactive decay event-sensitive surface, comprising an α-particle-sensitive surface upon which α-particles form α-tracks, which registers incident particles or rays from radon decay in said adsorbing surface, said radioactive decay event-sensitive surface being placed generally parallel to, and either adjacent to or spaced from said radon-adsorbing surface by less than 5.0 cm.

2. A device for measuring radon gas concentration in a radon-containing environment, comprising a radon gas-adsorbing surface, and a radioactive decay event-sensitive surface, comprising a surface upon which α- or β-particles cause voltage discharge, which registers incident particles or rays from radon decay in said adsorbing surface, said radioactive decay event-sensitive surface being placed generally parallel to, and either adjacent to or spaced from said radon-adsorbing surface by less than 5.0 cm.

3. A device for measuring radon gas concentration in a radon-containing environment, comprising a radon gas-adsorbing surface, and a radioactivity decay event-sensitive surface, comprising a storage phosphor material in which α, β, or decay events cause lattice excitations in said decay-sensitive surface, which registers incident particles or rays from radon decay in said adsorbing surface, said radioactive decay event-sensitive surface being placed generally parallel to, and either adjacent to or spaced from said radon-adsorbing surface by less than 5.0 cm.

4. The device of claim 1, 2 or 3 wherein said adsorbing surface has a capacity to adsorb radon at 90% relative humidity at 23° C., which capacity is at least 90% of its capacity to adsorb radon at 9% relative humidity at 23° C.

5. The device of claim 1, 2 or 3 wherein said radon-adsorbing surface retains less than 6% (w/w) water at 90% relative humidity at 23° C.

6. The device of claim 5 wherein said radon-adsorbing surface retains less than 2% (w/w) water at 90% relative humidity at 23° C.

7. The device of claim 1, 2 or 3 wherein said radon-adsorbing surface comprises fluorosilicalite.

8. The device of claim 1, 2 or 3 wherein said radon-adsorbing surface comprises silicalite.

9. The device of claim 1, 2 or 3 wherein said radon-adsorbing surface comprises activated charcoal.

10. The device of claim 1, 2 or 3 comprising a radon-selective window so that radon daughters are prevented from entering the device.

11. The device of claim 1, 2 or 3 wherein said surfaces are spaced by less than 1 cm.

12. The device of claim 1, 2 or 3, wherein said device further comprises a spacing means between said radon gas-adsorbing surface and said decay-sensitive surface.

13. The device of claim 1, 2 or 3 wherein the radon gas-adsorbing surface and radioactive decay event-sensitive surface are contained within a chamber comprising a radon-permeable window.

14. The device of claim 13 further comprising a chamber impermeable to radon daughters.

15. The device of claim 1, 2 or 3 wherein said adsorbing surface is positioned facing only a portion of said radioactive decay event-sensitive surface.

16. The device of claim 1, 2, or 3 wherein said radon adsorbing surface comprises a synthetic molecular seive material.

17. The device of claim 1, 2, or 3 wherein said adsorbing surface has a capacity to adsorb radon at 90% relative humidity at 23° C. which capacity is at least 80% of its capacity to adsorb radon at 0% relative humidity, at 23° C.

18. The device of claim 17 wherein said radon-adsorbing surface retains less than 6% (w/w) water at 90% relative humidity at 23° C.

19. The device of claim 17 wherein said radon-adsorbing surface retains less than 2% (w/w) water at 90% relative humidity at 23° C.

20. The device of claim 17, wherein said radon-adsorbing surface comprises fluorosilicalite.

21. The device of claim 17 wherein said radon-adsorbing surface comprises silicalite.

22. The device of claim 17 comprising a radon-selective window so that radon daughters are prevented from entering the device.

23. The device of claim 17 wherein said device further comprises a spacing means between said radon gas-adsorbing surface and said decay-sensitive surface.

24. The device of claim 17 wherein the radon gas-adsorbing surface and radioactive decay event-sensitive surface are contained within a chamber comprising a radon-permeable window.

25. The device of claim 24 further comprising a chamber impermeable to radon daughters.

26. The device of claim 17 wherein said adsorbing surface is positioned facing only a portion of said radioactive decay event-sensitive surface.

27. The device of claim 1, 2 or 3 further comprising a desiccant to remove moisture from said adsorbing surface to maintain said adsorbing surface essentially moisture-free during the period of testing under relative humidity conditions of at least 90% at 23° C.

28. The device of claim 27 wherein said radon-adsorbing surface retains less than 6% (w/w) water at 90% relative humidity at 23° C.

29. The device of claim 27 wherein said radon-adsorbing surface retains less than 2% (w/w) water at 90% relative humidity at 23° C.

30. The device of claim 27 wherein said radon-adsorbing surface comprises activated charcoal.

31. The device of claim 27 comprising a radon-selective window so that radon daughters are prevented from entering the device.

32. The device of claim 27 wherein said device further comprises a spacing means between said radon gas-adsorbing surface and said decay-sensitive surface.

33. The device of claim 27 wherein the radon gas-adsorbing surface and radioactive decay event-sensitive surface are contained within a chamber comprising a radon-permeable window.

34. The device of claim 33 further comprising a chamber impermeable to radon daughters.

35. The device of claim 27 wherein said adsorbing surface is positioned facing only a portion of said radioactive decay event-sensitive surface.

36. The device of claim 1 wherein the material for said α-particle-sensitive surface is chosen from polycarbonate plastic and nitrocellulose.

37. The device of claim 2 wherein said decay event-sensitive surface is electrically charged.

38. The device of claim 37 wherein said charged surface is contained in an electrically-shielded chamber.

39. The device of claim 3 wherein said decay event-sensitive surface is chosen from a thermostimulable storage phosphor and a photostimulable storage phosphor material.

40. A method for measuring radon gas concentration in a radon-containing environment, comprising the steps of:

providing a radon gas-adsorbing surface, providing a radioactive decay event-sensitive surface which registers incident particles or rays from radon gas decay, placing said radon gas-adsorbing surface and said decay-sensitive surface at a distance of less than 5.0 cm apart with the radon gas-adsorbing surface and said radioactive decay event-sensitive surface oriented generally parallel to each other, exposing said radon gas-adsorbing surface and said radioactive decay event-sensitive surface to said environment for a predetermined time, and detecting changes in said decay-sensitive surface as a measure of the radon gas concentration.

41. The method of claim 40, further comprising the step of providing a radon-adsorbing surface which has a capacity to adsorb radon gas at 90% relative humidity, 23° C., which capacity is at least 80% of its capacity to adsorb radon gas at 0% relative humidity at 23° C.

42. The method of claim 40, further comprising the step of positioning said adsorbing surface facing only a portion of said radioactive decay event-sensitive surface.

43. The method of claim 40 wherein said decay-sensitive surface is an $\alpha$-particle-sensitive surface upon which $\alpha$-particles form $\alpha$-tracks.

44. The method of claim 40 wherein said decay-sensitive surface is a surface upon which $\alpha$- or $\beta$-particles cause voltage discharge.

45. The method of claim 40 wherein said decay-sensitive surface is a storage phosphor material in which $\alpha$, $\beta$, or $\gamma$ decay events cause lattice excitations.

* * * * *

UNITED STATES PATENT AND TRADEMARK OFFICE
CERTIFICATE OF CORRECTION

PATENT NO. : 5,065,030
DATED : November 12, 1991
INVENTOR(S) : Daniel Perlman It is certified that error appears in the above-identified patent and that said Letters Patent is hereby corrected as shown below:

Column 1, paragraph 2, line 2: radon which rely upon detecting the a-particles, [a-particles] B-particles.

Column 6, under the heading ABSORBENT SURFACTS, paragraph 1, line 1: Activated charcoal has [ben] been Signed and Sealed this Thirtieth Day of August, 1994

Attest:

BRUCE LEHMAN

*Attesting Officer*  *Commissioner of Patents and Trademarks*